(12) United States Patent
Kim

(10) Patent No.: US 6,483,554 B1
(45) Date of Patent: Nov. 19, 2002

(54) TUNER CIRCUIT

(75) Inventor: Chul-min Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/391,614

(22) Filed: Sep. 7, 1999

(30) Foreign Application Priority Data

Sep. 5, 1998 (KR) ............................................ 98-36625

(51) Int. Cl.[7] ............................ H04N 5/50; H04N 5/268
(52) U.S. Cl. ........................................ 348/731; 348/706
(58) Field of Search .............................. 348/731, 733, 348/735, 736, 737, 738, 706, 707, 705

(56) References Cited

U.S. PATENT DOCUMENTS

| | | | |
|---|---|---|---|
| 4,361,854 A | | 11/1982 | Wolfe |
| 4,814,874 A | * | 3/1989 | Adachi ........................ 358/140 |
| 4,947,263 A | | 8/1990 | Yun |
| 5,673,088 A | * | 9/1997 | Nah ............................ 348/555 |
| 5,706,060 A | * | 1/1998 | Ruitenburg .................. 348/725 |
| 5,737,034 A | * | 4/1998 | Rhee .......................... 348/738 |
| 5,737,035 A | * | 4/1998 | Rotzoll ........................ 348/725 |
| 5,742,357 A | * | 4/1998 | Griesbaum .................. 348/731 |
| 6,094,229 A | * | 7/2000 | Ohshima ..................... 348/555 |

* cited by examiner

Primary Examiner—John Miller
Assistant Examiner—Annan Q. Shang
(74) Attorney, Agent, or Firm—Robert E. Bushnell, Esq.

(57) ABSTRACT

A tuner circuit and a method of designing a tuner circuit for removing a buffer circuit for video drive for increasing drive current capacitance added to an output terminal is provided, unlike a buffer for small-current drive installed in a tuner circuit. The method of designing a tuner circuit has a buffer installed in an integrated circuit (IC) of small-current drive in a video output terminal, and includes an RF converting portion, a tuning portion and a demodulation portion, in which a video output signal of the buffer in IC is input to an input circuit for processing a signal without an external buffer for drive, and the amount of attenuation of a signal at high frequency due to small drive current is measured to improve a frequency characteristic of a video signal in the tuner circuit in proportion to the amount of attenuation. Thus, an additional buffer for drive is not required, so that the number of devices is reduced, to thereby lower the material costs.

13 Claims, 4 Drawing Sheets

FIG. 1 *(Background Art)*

TUNER CIRCUIT

This application makes reference to, incorporates the same herein, and claims all benefits accruing under 35 U.S.C § 119 from an application entitled Method Of Designing Tuner Circuit earlier filed in the Korean Industrial Property Office on the day of Sep. 5$^{th}$, 1998, and there duly assigned Ser. No. 98-36625 by that Office.

BACKGROUND OF THE INVENTION

1. Field of the Invention

The present invention generally relates to image signal processing and image signal circuits, and, more particularly, to tuning signal processing and tuning circuits with small output drive currents exhibiting increased drive current capacitance at an output terminal.

2. Description of the Related Art

Typically, a tuning circuit in a video tape recorder (i.e., a VCR) includes an radio frequency converter, a tuner and a demodulator. A broadcasting signal received by an antenna is output to a radio frequency amplifier and an output mode switch through a distributor. The RF converter includes the distributor, an output switch, and a modulator. The tuner includes the RF amplifier, a mixer, and a local oscillator while the demodulator includes a surface acoustic wave (i.e., a SAW) filter, a demodulator, an output buffer, and frequently, an external buffer that is often necessary to provide a current necessary to drive some external appliances that is larger than can be obtained with the output buffer included in the integrated circuit.

In the operation of a typical tuning circuit constructed as an integrated circuit, a broadcast signal is amplified at its radio frequency, mixed with a local oscillation frequency signal of a channel predetermined by the local oscillator in order to convert the broadcast signal into an intermediate frequency. The intermediate frequency is then demodulated. The demodulated video signal is applied through the internal output buffer that provides a small drive current of between approximately 0.5~1 milli-Amperes. A selection switch selects a video signal to apply to a video signal processor from between the video signal from the tuner circuit or a video input signal applied to an input video jack. When the tuner circuit is constructed as an integrated circuit, an externally connected circuit can be driven with a driving current of approximately 0.5~1 milli-Amperes; this range of amplitudes is common in integrated circuits. I have noticed that if a circuit connected to the integrated tuner circuit should happen to require a driving current of 10 milli-Amperes or more however, an external buffer must be incorporated into the tuner circuit between the output buffer in order to obtain a sufficiently large driving current from the integrated circuit. I have found that absent the external buffer, the ability of the integrated tuning circuit deteriorates to the point that attenuation occurs in the high frequency signal components of the video signal, thereby markedly reduces the gain of the higher frequency characteristics of the video signal.

SUMMARY OF THE INVENTION

It is therefore, an object of the present invention to provide an improved tuning process and video image signal tuning circuit.

It is another object to provide tuning signal processing and tuning circuits able to increase drive current capacitance at an output terminal.

It is still another object to provide a process and tuning circuit able to increase drive current capacitance at an output terminal without resort to an external buffer circuit.

It is yet another object to provide a process and tuning circuit able to increase drive current capacitance at an output terminal without resort to an external buffer circuit.

It is still yet another object to provide a process and integrated tuning circuit able to reduce attenuation of the gain of the higher frequency components of a video signal.

It is a further object to provide a tuning signal process and tuning circuit having a small output drive current, that exhibits increased drive current capacitance at an output terminal.

It is a still further object to provide a process and integrated tuning circuit using a buffer that produces a small driving current while minimizing the attenuation of the higher frequency characteristics of video signals.

These and other objects may be attained with a tuning circuit and process that uses a buffer installed within an integrated circuit (IC) providing small-current drive at a video output terminal. The tuning circuit has an RF converter, a tuner and a demodulator. A video output signal from the buffer in the integrated circuit is input to an input circuit for processing a signal without an external buffer, and the amount of attenuation of the gain of the higher frequency components of the video signal due to the low amplitude of the small drive current improves the frequency characteristic of a video signal in the tuner circuit in proportion to the amount of attenuation.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
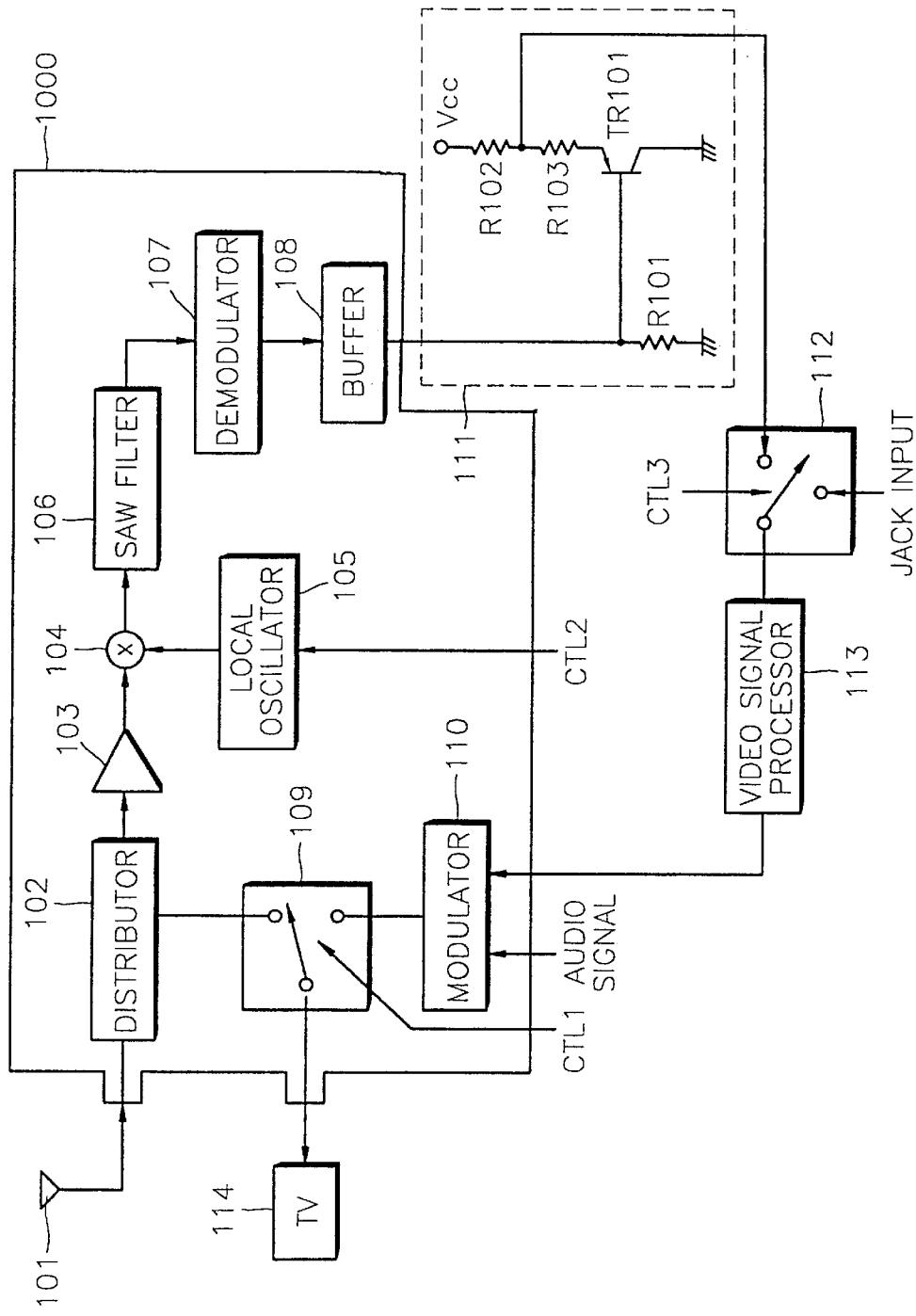
FIG. 1 is a circuit diagram of a tuning circuit and its applied peripheral circuits.

Turning now to the drawings, FIG. 1 illustrates tuner circuit 1000 with a radio frequency converter that uses a distributor 102, a TV/CR switch 109, and a modulator 110. The tuner includes a RF amplifier 103, a mixer 104, and a local oscillator 105. The demodulation stage includes a SAW filter 106, a demodulator 107, a buffer 108, and an external buffer 111. Circuits external to tuner circuit 1000 include a tuner/jack input selection switch 112, a video signal processor 113, and an external output, e.g., television (TV) 114. When the TV/VCR switch 109 is switched to the TV mode, the broadcasting signal received from the distributor 102 is applied to TV 114 in response to a control signal CTL1, and a VCR mode, i.e., video/audio signals output from the video signal processor 113 of a VCR and an audio signal processor (not shown) of a VCR is modulated to a predetermined channel by the modulator 110, and then the modulated signal is output to the TV 114.

In the operation of the tuner circuit, a broadcasting signal received by an antenna 101 is output to the RF amplifier 103 and the TV/CR switch 109 through the distributor 102, and the broadcasting signal output from the distributor 102 is amplified by the RF amplifier 103. Then, a local oscillation frequency signal of a channel predetermined by the local oscillator 105 controlled by a control signal CTL2 and the amplified broadcasting signal are mixed in the mixer 104. Thus, 18 the mixer 104 converts the broadcasting signal to an intermediate frequency and outputs it to the demodulation portion.

A video signal is demodulated by the demodulation portion, and then the demodulated signal is output through the buffer 108 having a small drive current of approximately 0.5~1 mA. In the tuner/jack input selection switch 112, either a video signal output from the tuner circuit or a jack video input signal is selected by a control signal CLT3 and the selected signal is input to the video signal processor 113.

Figure 3A:
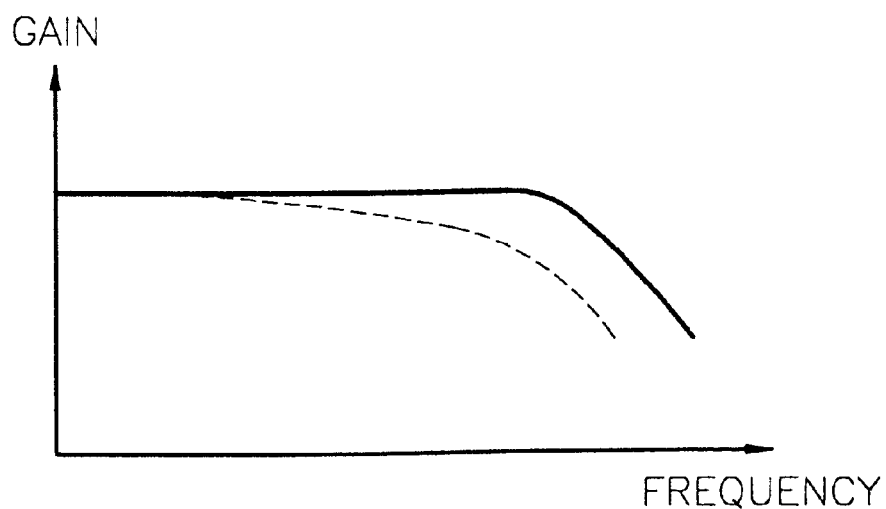
FIG. 3A is a graph illustrating that frequency characteristics of a video signal when the driving current is insufficient.

In an integrated circuit (IC) having the tuner circuit 1000, an externally connected circuit can be driven by a driving current of approximately 0.5~1 milli-Amperes. A circuit connected to the integrated circuit having the tuner circuit requires a driving current of 10 milli-Amperes or more so that the external buffer 111 for producing a sufficient driving current must be added to the integrated circuit having the tuner circuit. If the external buffer 111 for producing the driving current is not used, the driving ability is deteriorated so that the attenuation of a high frequency signal component occurs to thereby deteriorate frequency characteristic of a video signal indicated by a dotted line of FIG. 3A.

Figure 2:
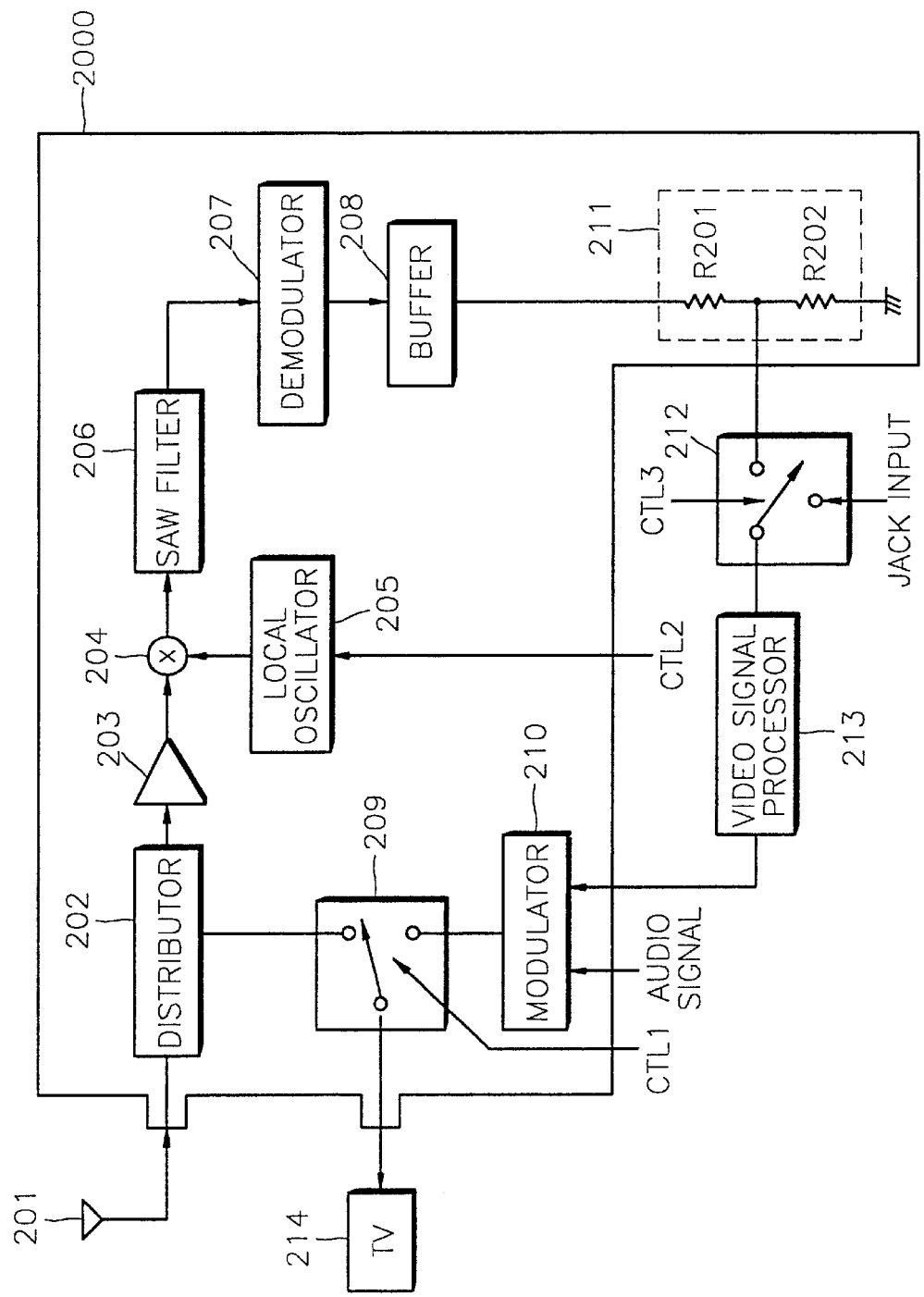
FIG. 2 is a circuit diagram of a tuner circuit and its applied peripheral circuits constructed according to the principles of the present invention for designing a tuning circuit.

As shown in FIG. 2, a tuner circuit 2000 constructed according to the principles of the present invention includes an RF converter, a tuner, and a demodulation stage. A broadcast signal received from an antenna 201 is applied to the tuner and the T/VCR switch 209 of the RF converter through a distributor 202. The RF converter includes a distributor 202, a TV/VCR switch 209, and a modulator 210. The tuner includes a RF amplifier 203, a mixer 204, and a local oscillator 205. The demodulation stage includes a SAW filter 206, a demodulator 207, a buffer 208, and a video signal level adjuster 211. Circuits external to tuner circuit 2000 include a tuner/jack input selection switch 212, a video signal processor 213, and an external appliance, i.e., television (TV) 214. The video jack signal is an externally generated video signal that is applied to the VCR through the input jack mounted in the rear panel of the VCR, via switch 212.

Control signals CLT1, CLT2 and CLT3 maybe generated by a system controller (not shown) of the VCR that is external to the tuning circuit in response, by way of example, to a key input by a user. CTL1 is a control signal for switching the output mode of the VCR. When, for example, a user set the output mode of the VCR to the television mode (i. e., the TV mode), the broadcast signals received via antenna 201 are applied by switch 209 directly to television set 214. When the output mode of switch 209 is set however, to the VCR mode, either the broadcast signals that pass through the tuner of the VCR or the video signals introduced to video signal processor 213 via the input jact of switch 212 are applied via switch 209 to television set 214. Consequently, during the TV mode, audio and video signals transmitted by a broadcast studio are directly applied to television set 214 via the VCR, while during the VCR mode the signals are first converted to a specific channel and are then applied via switch 209 to television set 214.

CTL2 is a control signal for selecting one of a plurality of channels. When the user selects a broadcast channel through a either a key or a remote control input (not shown), signal CTL2 controls the oscillation frequency of the local oscillator in order to convert the video signal carried by only the selected broadcast channel into an intermediate frequency signal. CTL3 selects a video signal input to the VCR via the input jack, as an input signal for video signal processor 213, in response to a key input by a user, and in default of that key input, selects the output signal from the tuning circuit to apply to signal processor 213.

When the TV/VCR switch 209 is switched to the TV mode, the broadcasting signal received from the distributor 202 is output to the TV 214 in response to a control signal CTL1, and a VCR mode, i.e., video/audio signals output from the video signal processor 213 of a VCR and an audio signal processor (not shown) of a VCR is modulated to a predetermined channel, e.g., 3/4CH in Korea and U.S., 1,2CH in Japan and 13CH in Taiwan, by the modulator 210, and then the modulated signal is output to the TV 214.

Also, in the tuning portion, the broadcasting signal output from the distributor 202 is amplified by the RF amplifier 203. Then, a local oscillation frequency signal of a channel predetermined by the local oscillator 205 controlled by a control signal CTL2 and the amplified broadcasting signal are mixed in the mixer 204. Thus, the mixer 204 converts the broadcasting signal to an intermediate frequency and outputs it to the demodulation portion.

Figure 4A:
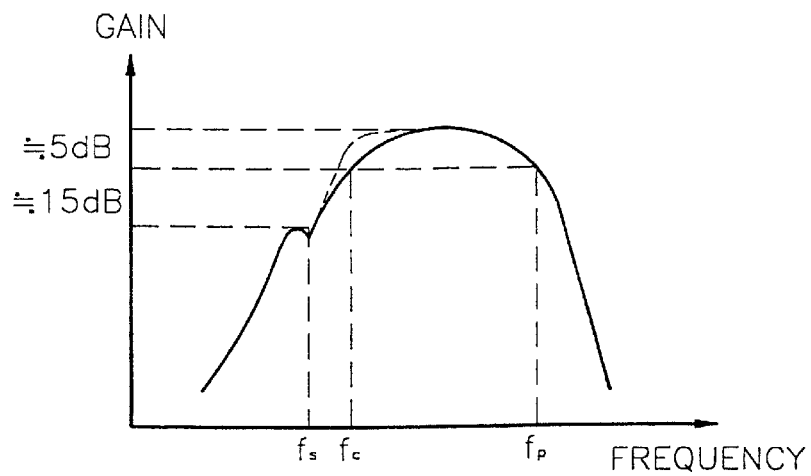
FIG. 4A is a graph showing the frequency characteristics of the video signal of FIG. 3B according to a change in the design of a surface acoustic wave filter.

In the demodulation portion, band characteristics of a signal are set such that a predetermined difference of gains among a picture frequency $f_p$, a color frequency $f_c$ and a sound frequency $f_s$ is generated by the SAW filter 206 to be frequency characteristics the same as a waveform indicated by a solid line of FIG. 4A. Then, demodulation is performed by the demodulator 207, and a frequency component of the audio signal is separated by an internal sound trap (SIF TRAP) circuit, and then the separated signal is output to the buffer 208. The buffer 208 has a small drive current of approximately 0.5~1 mA.

The level of the demodulated video signal output from an integrated circuit of a tuner circuit, including buffer 208 driven by a small current, is adjusted by resistors R201 and R202 of the video signal level adjuster 211, and the signal having the adjusted level is applied to one input terminal of the tuner/jack input selection switch 212, and a jack video input signal is applied to the other input terminal of the tuner/jack input selection switch 212.

In the tuner/jack input selection switch 212, either a video signal output from the tuner circuit or a jack video input signal is selected by a control signal CLT3 and the selected signal is input to the video signal processor 213. Also, in the video signal processor 213, a record/reproduction signal is processed per mode, and the processed signal is output to the modulator 210 of the RF converting portion of the tuner circuit 2000 to be modulated to a channel appropriate for the country in which the tuner circuit is used, and then the modulated signal is output to the TV 214 through the TV/VCR switch 209.

A more detailed discussion of the audio signal processing block of the VCR is omitted from the description of the tuning circuit in the foregoing paragraphs. An audio signal is separated by a sound trap that maybe included in demodulator 207 and filtered to ground. The audio signal applied to modulator 210 is a signal that is output after a video signal is cut off by the video trap circuit. The filter is included in the audio signal processor (not shown) and only the audio signal is filtered and processed among the signal output from SAW filter 206 of the tuner.

According to the present invention, the video output signal of the buffer 208 for the tuner circuit is directly applied to the tuner/jack input selection switch 212 of an input circuit for processing a signal, without an external buffer for producing drive.

Thus, when a small-current video signal is generated by the tuner circuit 2000 without an external buffer for increasing the driving current to the outside of the tuner circuit 2000 of an integrated circuit, attenuation occurs in a high frequency band of the video signal due to the capacitance component existing in a printed circuit board (PCB) pattern.

Here, a design method for solving the above-described problems without adding an external drive buffer to the tuner circuit will be described.

A device having an input impedance value, more than a predetermined value, of the tuner/jack input selection switch 212 connected to an output terminal of the tuner circuit 2000 is used. This is because the drive current is increased when the input impedance of the tuner/jack input selection switch 212 is low in view of the output terminal of the tuner circuit 2000. Thus, when the input impedance value of the tuner/jack input selection switch 212 is increased, the drive current output from the tuner circuit 2000 can be relatively reduced. When the input impedance value of the tuner/jack input selection switch 212 is at least 30 kΩ or more, the drive current does not increase.

By a second method, the printed pattern length of a printed circuit board connecting an output terminal of the buffer 208 for video drive, of the tuner circuit 2000, to an input terminal of the tuner/jack input selection switch 212, is designed to be as short as possible. This improves the problem of attenuating a high frequency component due to a capacitive component in the pattern of the printed circuit board, when the drive capacity is less. That is, the pattern length of the printed circuit board connecting the output terminal of the video buffer 208 of the tuner circuit 2000 and the input terminal of the tuner/jack input selection switch 212 thereof is shortened, to thereby reduce the capacitance to a minimum and thus reduce the amount of attenuation of the high frequency component.

Figure 3B:
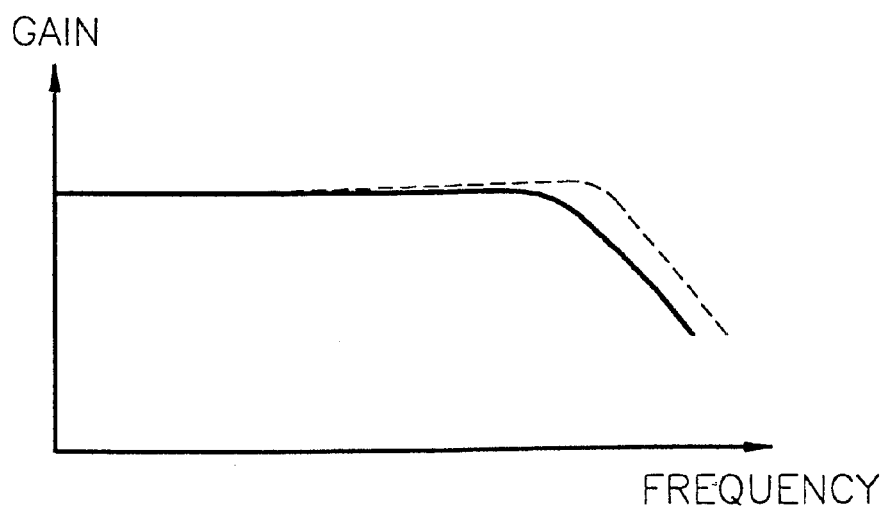
FIG. 3B is a graph showing an increase the frequency characteristics of a video signal in considering the attenuation amount according to the process for designing a tuner circuit of the present invention.

The lack of the drive current may cause the attenuation of signals in the high frequency band despite a design compensatory to the above problems. Thus, to compensate the attenuation of the high frequency component, as shown by the dotted line of FIG. 3B, the gain characteristic in the high frequency band is improved in accordance with the amount of attenuation caused by the lack of drive current.

Figure 4B:
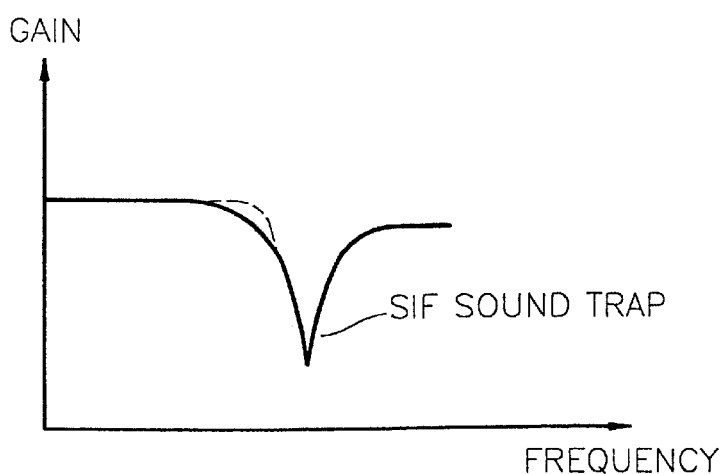
FIG. 4B is a graph showing the frequency characteristics of the video signal of FIG. 3B according to the design of a sound trap (SIF TRAP)
Figure 5:
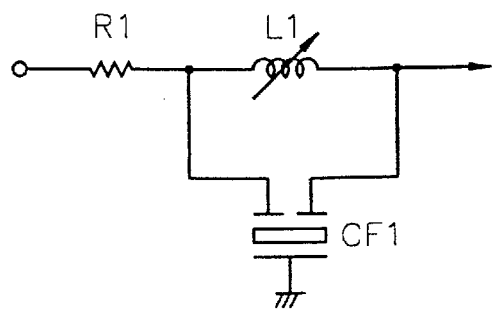
FIG. 5 is a circuit diagram of the sound trap of FIG. 4B.

By a method for improving the characteristic of a video frequency, as shown by the dotted line of FIG. 4A, a frequency near a color frequency $f_c$ is boosted up by a predetermined amount in accordance with the amount of attenuation in the high frequency band by designing of a SAW filter installed in the demodulation portion of the tuner circuit 2000 to increase the characteristic of the video signal at high frequency. Also, by another method, in designing the SIF TRAP installed in the demodulation portion of the tuner circuit 2000 shown in FIG. 5, values of a ceramic filter CF1, a resistor R1 and an inductance L1 are adjusted and thus the amount of attenuation and the sharpness (Q) are adjusted as shown by the dotted line of FIG. 4B to improve the characteristic of the video signal at high frequency.

As described above, the solution of the input impedance of a device and the length of a printed circuit board pattern, and compensation of the frequency characteristic of a video signal in the tuner circuit enable compensation of the attenuation of a signal rapidly generated from the high frequency band without the external buffer 111 for video drive, which is required by the integrated tuner circuit of FIG. 1. Thus, the frequency characteristic of a video signal can be prevented from being attenuated, using a buffer for small-current drive of an integrated circuit having a tuner circuit, to thereby reduce material cost.

What is claimed is:

1. A method of designing a tuning circuit, comprising installing a buffer within an integrated circuit exhibiting a small amplitude drive current at a video output terminal, the tuning circuit having an RF converter, a tuner and a demodulation stage, wherein a video output signal of the buffer is input to an input circuit for processing a signal without an external buffer for drive, and the amount of attenuation of a high frequency of a signal due to small drive current is measured to improve the frequency characteristic of a video signal in the tuner circuit in proportion to the amount of attenuation.

2. The method of claim 1, wherein the input circuit for processing a signal is a tuner/jack input selection switch, and the input impedance of the tuner/jack input selection switch is at least 30 K(Ω) or more.

3. The method of claim 1, wherein the tuning circuit is designed to boost high frequencies near a color frequency $f_c$ of the SAW filter in the demodulation portion to improve frequency characteristic of a video signal.

4. The method of claim 1, wherein the tuning circuit is designed to adjust the attenuation and the sharpness (Q) of the sound trap (SIF TRAP) in the demodulation portion.

5. A tuner circuit comprised of an integrated circuit, said integrated circuit comprising:
   means for providing a received radio frequency (RF) video signal to a tuning circuit and to a television;
   said tuning circuit converting said received radio frequency (RF) video signal to an intermediate frequency (IF) video signal of a predetermined channel frequency;
   a demodulator for demodulating the IF video signal and separating an audio signal from the demodulated video signal; and
   a buffer having a small drive current for providing the separated demodulated video signal output from said demodulator to a video signal level adjustor for adjusting the level of the separated demodulated video signal.

6. The tuner circuit as set forth in claim 5, said means for providing a received radio frequency (RF) video signal to a tuning circuit and to a television comprising:
   a distributor and a TV/VCR switch, wherein said distributor provides said RF video signal to said TV/CR switch and to said tuning circuit, and said TV/VCR switch provides said RF video signal to said television in a television mode.

7. The tuner circuit as set forth in claim 5, said tuner circuit comprising:

an amplifier for outputting an amplified RF video signal by amplifying said RF video signal provided to said tuner circuit;

a mixer for mixing the amplified RF video signal with a local oscillation signal;

a demodulation portion to convert the amplified RF video signal to said IF video signal of said predetermined channel frequency; and a SAW filter for filtering the frequency characteristics of said IF video signal and providing a filtered IF video signal to said demodulator.

8. The tuner circuit as set forth in claim 5, said demodulator comprising:

a sound trap for separating said audio signal from said IF video signal to improve the characteristics of said separated demodulated video signal at a high frequency.

9. The tuner circuit as set forth in claim 8, said sound trap comprising:

a resistor connected in series with a variable inductor and a ceramic filter coupled in parallel with said variable inductor.

10. The tuner circuit as set forth in claim 5, said video signal level adjustor comprising:

a first resistor coupled between said buffer and a node; and a second resistor coupled between said node and a ground terminal.

11. The tuner circuit as set forth in claim 6, said video signal level adjustor comprising:

a first resistor coupled between said buffer and a node; and a second resistor coupled between said node and a ground terminal.

12. The tuner circuit as set forth in claim 11, further comprising:

a selection switch having a first input terminal connected to said node, a second input terminal connected to receive a jack video input signal and an output terminal;

a video signal processor of a video cassette recorder connected to the output terminal of said selection switch; and a modulator for receiving said separated audio signal and an output of said video signal processor, said modulator modulating the output of said video signal processor to a predetermined channel for output to said TV/VCR switch for output to said television.

13. The tuner circuit as set forth in claim 12, wherein said selection switch is a tuner/jack input selection switch, and the input impedance of the tuner/jack input selection switch is at least 30 K($\Omega$).

* * * * *